(12) United States Patent
Lim et al.

(10) Patent No.: US 11,526,052 B2
(45) Date of Patent: Dec. 13, 2022

(54) BACKLIGHT UNIT AND LIQUID CRYSTAL DISPLAY DEVICE INCLUDING THE SAME

(71) Applicant: Samsung Display Co., Ltd., Yongin-Si (KR)

(72) Inventors: Ho Lim, Suwon-si (KR); Kaeun Kim, Seongnam (KR); Taemin Kim, Hwaseong-si (KR); Kawon Pak, Seoul (KR); Duckjong Suh, Gwangmyeong-si (KR); Bongsung Seo, Suwon-si (KR); Jaejin Lyu, Yongin-si (KR); Shulgee Lee, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/724,697

(22) Filed: Dec. 23, 2019

(65) Prior Publication Data

US 2020/0241362 A1  Jul. 30, 2020

(30) Foreign Application Priority Data

Jan. 24, 2019 (KR) ........................ 10-2019-0009215

(51) Int. Cl.
*G02F 1/13357* (2006.01)
*G02F 1/1335* (2006.01)

(52) U.S. Cl.
CPC .. G02F 1/133608 (2013.01); G02F 1/133606 (2013.01); *G02F 1/133607* (2021.01)

(58) Field of Classification Search
CPC ......... G02F 1/133608; G02F 1/133609; G02F 2001/133607; C09K 2323/05; C09K 2323/053; C09K 2323/06; C08J 2383/06

(Continued)

(56) References Cited

U.S. PATENT DOCUMENTS 7,604,866 B2  10/2009  Ohashi et al.
9,106,243 B2   8/2015  Lee et al.
(Continued)

FOREIGN PATENT DOCUMENTS

JP   2012189802   10/2012
JP   2013254183   12/2013
(Continued)

OTHER PUBLICATIONS

European Examination Report dated Jun. 19, 2020 issued in corresponding European Patent Application No. 20150843.9.

*Primary Examiner* — Ruiyun Zhang
(74) *Attorney, Agent, or Firm* — F. Chau & Associates, LLC

(57) ABSTRACT

A backlight unit which includes a light guiding layer having an incident surface on which light is incident and an exit surface from which light is emitted, a light source disposed on the incident surface of the light guiding layer and configured to generate the light, a low refraction layer disposed on the exit surface of the light guiding layer, a color control layer disposed on the low refraction layer, and a protection layer disposed on the color control layer. The protection layer includes a resin composition including a first repeating unit represented by Formula 1:

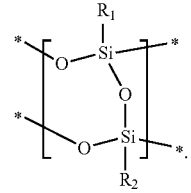

[Formula 1]

17 Claims, 7 Drawing Sheets

(58) Field of Classification Search
USPC ........ 428/1.1, 1.5, 1.52, 1.6; 349/61, 64, 71; 438/26; 257/100
See application file for complete search history.

(56) References Cited

U.S. PATENT DOCUMENTS

| | | |
|---|---|---|
| 9,199,842 B2 | 12/2015 | Dubrow et al. |
| 2016/0363698 A1* | 12/2016 | Fan ..................... C09D 183/04 |
| 2017/0058129 A1 | 3/2017 | Park et al. |
| 2018/0112049 A1* | 4/2018 | Song ..................... C08G 73/14 |

FOREIGN PATENT DOCUMENTS

| | | |
|---|---|---|
| JP | 2017068248 | 4/2017 |
| JP | 2017068248 A * | 4/2017 |
| JP | 2019008906 | 1/2019 |
| KR | 10-2013-0120486 | 11/2013 |
| KR | 10-2015-0027410 | 3/2015 |
| KR | 10-2015-0027582 | 3/2015 |
| KR | 10-2015-0028252 | 3/2015 |
| KR | 10-2016-0117083 | 10/2016 |
| KR | 10-2018-0003171 | 1/2018 |
| KR | 10-2020-0091521 | 7/2020 |
| WO | 2004113966 | 12/2004 |
| WO | 2017073620 | 5/2014 |

* cited by examiner

BACKLIGHT UNIT AND LIQUID CRYSTAL DISPLAY DEVICE INCLUDING THE SAME

CROSS-REFERENCE TO RELATED APPLICATIONS

This application claims priority under 35 U.S.C. § 119 to Korean Patent Application No. 10-2019-0009215, filed on Jan. 24, 2019, the disclosure of which is incorporated by reference in its entirety herein.

TECHNICAL FIELD

The present disclosure herein relates to a backlight unit and a liquid crystal display device including the same, and more specifically, to a backlight unit having improved reliability by effectively protecting a color control layer, and a liquid crystal display device including the same.

DISCUSSION OF RELATED ART

Many electronic devices include display devices for providing images to the user. Liquid crystal display devices are often used for electronic devices that have large displays as well as for portable electronic devices having relatively small displays due to the relatively low power consumption of liquid crystal display devices. Liquid crystal display devices typically include various optical members that are added to a backlight unit in order to increase the light efficiency and color reproducibility of the display device.

However, the display quality of the display device may be lowered by scratches and the like generated during various process which may permit external moisture and oxygen to penetrate into the backlight unit.

SUMMARY

The present disclosure provides a backlight unit having improved reliability by preventing damages caused due to the external environment, and a liquid crystal display device including the same.

An exemplary embodiment of the present inventive concepts provides a backlight unit including a light guiding layer having an incident surface on which light is incident and an exit surface from which light is emitted, a light source disposed on the incident surface of the light guiding layer and configured to generate the light, a low refraction layer disposed on the exit surface of the Light guiding layer, a color control layer disposed on the low refraction layer, and a protection layer disposed on the color control layer, wherein the protection layer includes a resin composition including a first repeating unit represented by Formula 1 below.

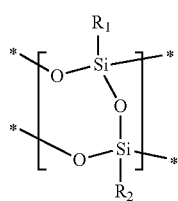

[Formula 1]

In Formula 1, $R_1$ and $R_2$ are each independently selected from a hydrogen atom, a deuterium atom, a halogen atom, a substituted or unsubstituted amine group, a substituted or unsubstituted epoxy group, a substituted or unsubstituted thiol group, an acrylic group, a methacrylic group, an isocyanate group, a nitrile group, a nitro group, a substituted or unsubstituted alkyl group having 1 to 10 carbons, a substituted or unsubstituted alkenyl group having 2 to 10 carbon atoms, a substituted or unsubstituted alkoxy group having 1 to 40 carbon atoms, a substituted or unsubstituted cycloalkyl group having 3 to 12 ring-forming carbon atoms, a substituted or unsubstituted heterocycloalkyl group having 2 to 12 ring-forming carbon atoms, a substituted or unsubstituted aryl group having 6 to 30 ring-forming carbon atoms, a substituted or unsubstituted heteroaryl group having 2 to 30 ring-forming carbon atoms, a substituted or unsubstituted aralkyl group having 6 to 30 ring-forming carbon atoms, a substituted or unsubstituted aryloxy group having 6 to 30 ring-forming carbon atoms, or a substituted or unsubstituted aryl thiol group having 6 to 30 ring-forming carbon atoms.

In an exemplary embodiment, the resin composition may further include a second repeating unit represented by Formula 2 below,

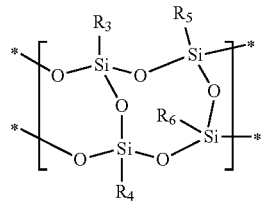

[Formula 2]

In Formula 2, $R_3$ to $R_6$ are each independently selected from a hydrogen atom, a deuterium atom, a halogen atom, a substituted or unsubstituted amine group, a substituted or unsubstituted epoxy group, a substituted or unsubstituted thiol group, an acrylic group, a methacrylic group, an isocyanate group, a nitrile group, a nitro group, a substituted or unsubstituted alkyl group having 1 to 10 carbons, a substituted or unsubstituted alkenyl group having 2 to 10 carbon atoms, a substituted or unsubstituted alkoxy group having 1 to 40 carbon atoms, a substituted or unsubstituted cycloalkyl group having 3 to 12 ring-forming carbon atoms, a substituted or unsubstituted heterocycloalkyl group having 2 to 12 ring-forming carbon atoms, a substituted or unsubstituted aryl group having 6 to 30 ring-forming carbon atoms, a substituted or unsubstituted heteroaryl group having 2 to 30 ring-forming carbon atoms, a substituted or unsubstituted aralkyl group having 6 to 12 ring-forming carbon atoms, a substituted or unsubstituted aryloxy group having 6 to 12 ring-forming carbon atoms, or a substituted or unsubstituted aryl thiol group having 6 to 12 ring-forming carbon atoms.

In an exemplary embodiment, the mole ratio of the first repeating unit and the second repeating unit may be 1:1000 to 1000:1.

In an exemplary embodiment, the resin composition may further include a third repeating unit represented by Formula 3 below,

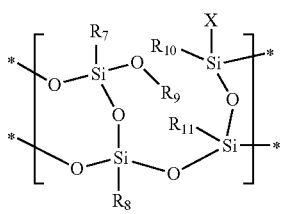

[Formula 3]

In Formula 3, X is either $OR_{12}$ or $O(SiO_{3/2}R_{13})_{4+2n}$, and $R_7$ to $R_{13}$ are each independently selected from a hydrogen atom, a deuterium atom, a halogen atom, a substituted or unsubstituted amine group, a substituted or unsubstituted epoxy group, a substituted or unsubstituted thiol group, an acrylic group, a methacrylic group, an isocyanate group, a nitrile group, a nitro group, a substituted or unsubstituted alkyl group having 1 to 10 carbons, a substituted or unsubstituted alkenyl group having 2 to 10 carbon atoms, a substituted or unsubstituted alkoxy group having 1 to 40 carbon atoms, a substituted or unsubstituted cycloalkyl group having 3 to 12 ring-forming carbon atoms, a substituted or unsubstituted heterocycloalkyl group having 2 to 12 ring-forming carbon atoms, a substituted or unsubstituted aryl group having 6 to 30 ring-forming carbon atoms, a substituted or unsubstituted heteroaryl group having 2 to 30 ring-forming carbon atoms, a substituted or unsubstituted aralkyl group having 6 to 12 ring-forming carbon atoms, a substituted or unsubstituted aryloxy group having 6 to 12 ring-forming carbon atoms, or a substituted or unsubstituted aryl thiol group having 6 to 12 ring-forming carbon atoms, and n is an integer of 0 or more.

In an exemplary embodiment, the mole ratio of the first repeating unit and the third repeating unit may be 1:1000 to 1000:1.

In an exemplary embodiment, the protection layer may further include a silica particle.

In an exemplary embodiment, the protection layer may be disposed in the outermost region of the backlight unit.

In an exemplary embodiment, the color control layer may include a quantum dot.

In an exemplary embodiment, the color control layer may further include a base resin and scattering particles dispersed in the base resin.

In an exemplary embodiment, the low refraction layer may have a refractive index of 1.2 to 1.4, and comprise hollow silica.

In an exemplary embodiment, the low refraction layer may be disposed directly on the light guiding layer.

In an exemplary embodiment, the backlight unit may further include at least one barrier layer disposed adjacent to at least one surface of the color control layer.

In an exemplary embodiment, the at least one barrier layer may include at least one inorganic film.

In an exemplary embodiment, the backlight unit may further include a barrier layer disposed between the color control layer and the low refraction layer and between the color control layer and the protection layer, respectively.

In an exemplary embodiment, the light guiding layer may include a light guiding pattern.

In an exemplary embodiment of the present inventive concepts, a liquid crystal display device includes a liquid crystal display panel configured to display an image and a backlight unit configured to provide light to the liquid crystal display panel. The backlight unit includes a light source configured to generate the light, a light guiding layer configured to guide the light generated from the light source, a low refraction layer disposed on the light guiding layer, a color control layer disposed on the low refraction layer, and a protection layer disposed on the color control layer and including a resin composition including a first repeating unit represented by Formula 1 below.

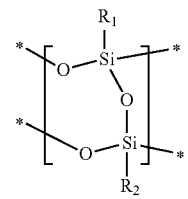

[Formula 1]

In Formula 1, $R_1$ and $R_2$ are each independently selected from a hydrogen atom, a deuterium atom, a halogen atom, a substituted or unsubstituted amine group, a substituted or unsubstituted epoxy group, a substituted or unsubstituted thiol group, an acrylic group, a methacrylic group, an isocyanate group, a nitrile group, a nitro group, a substituted or unsubstituted alkyl group having 1 to 10 carbons, a substituted or unsubstituted alkenyl group having 2 to 10 carbon atoms, a substituted or unsubstituted alkoxy group having 1 to 40 carbon atoms, a substituted or unsubstituted cycloalkyl group having 3 to 12 ring-forming carbon atoms, a substituted or unsubstituted heterocycloalkyl group having 3 to 12 ring-forming carbon atoms, a substituted or unsubstituted aryl group having 6 to 30 ring-forming carbon atoms, a substituted or unsubstituted heteroaryl group having 2 to 30 ring-forming carbon atoms, a substituted or unsubstituted aralkyl group having 3 to 12 ring-forming carbon atoms, a substituted or unsubstituted aryloxy group having 3 to 12 ring-forming carbon atoms, or a substituted or unsubstituted aryl thiol group having 3 to 12 ring-forming carbon atoms.

In an exemplary embodiment of the present inventive concepts, a liquid crystal display device includes a liquid crystal display panel configured to display an image and a backlight unit configured to provide light to the liquid crystal display panel. The backlight unit includes a color control layer including a quantum dot, and a protection layer disposed on the color control layer and including a resin composition including two or more kinds of polysilsesquioxanes having different repeating units.

In an exemplary embodiment, the resin composition may be either a thermosetting resin or a photo-curable resin.

In an exemplary embodiment, the protection layer may have a thickness of 1 μm to 10 μm.

In an exemplary embodiment, a composition for a protection layer of a backlight unit for a display device includes a resin composition including a first repeating unit represented by Formula 1 below.

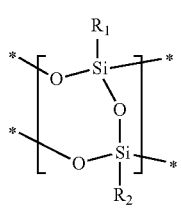

[Formula 1]

In Formula 1, $R_1$ and $R_2$ are each independently selected from a hydrogen atom, a deuterium atom, a halogen atom, a substituted or unsubstituted amine group, a substituted or unsubstituted epoxy group, a substituted or unsubstituted thiol group, an acrylic group, a methacrylic group, an isocyanate group, a nitrile group, a nitro group, a substituted or unsubstituted alkyl group having 1 to 10 carbons, a substituted or unsubstituted alkenyl group having 2 to 10 carbon atoms, a substituted or unsubstituted alkoxy group having 1 to 40 carbon atoms, a substituted or unsubstituted cycloalkyl group having 3 to 12 ring-forming carbon atoms, a substituted or unsubstituted heterocycloalkyl group having 3 to 12 ring-forming carbon atoms, a substituted or unsubstituted aryl group having 6 to 30 ring-forming carbon atoms, a substituted or unsubstituted heteroaryl group having 2 to 30 ring-forming carbon atoms, a substituted or unsubstituted aralkyl group having 3 to 12 ring-forming carbon atoms, a substituted or unsubstituted aryloxy group having 3 to 12 ring-forming carbon atoms, or a substituted or unsubstituted aryl thiol group having 3 to 12 ring-forming carbon atoms.

BRIEF DESCRIPTION OF THE DRAWINGS

The accompanying drawings are included to provide a further understanding of the present inventive concepts, and are incorporated in and constitute a part of this specification. The drawings illustrate exemplary embodiments of the present inventive concepts and, together with the description, serve to explain principles of the inventive concepts. In the drawings.

DETAILED DESCRIPTION OF THE EXEMPLARY EMBODIMENTS

Figure 1:
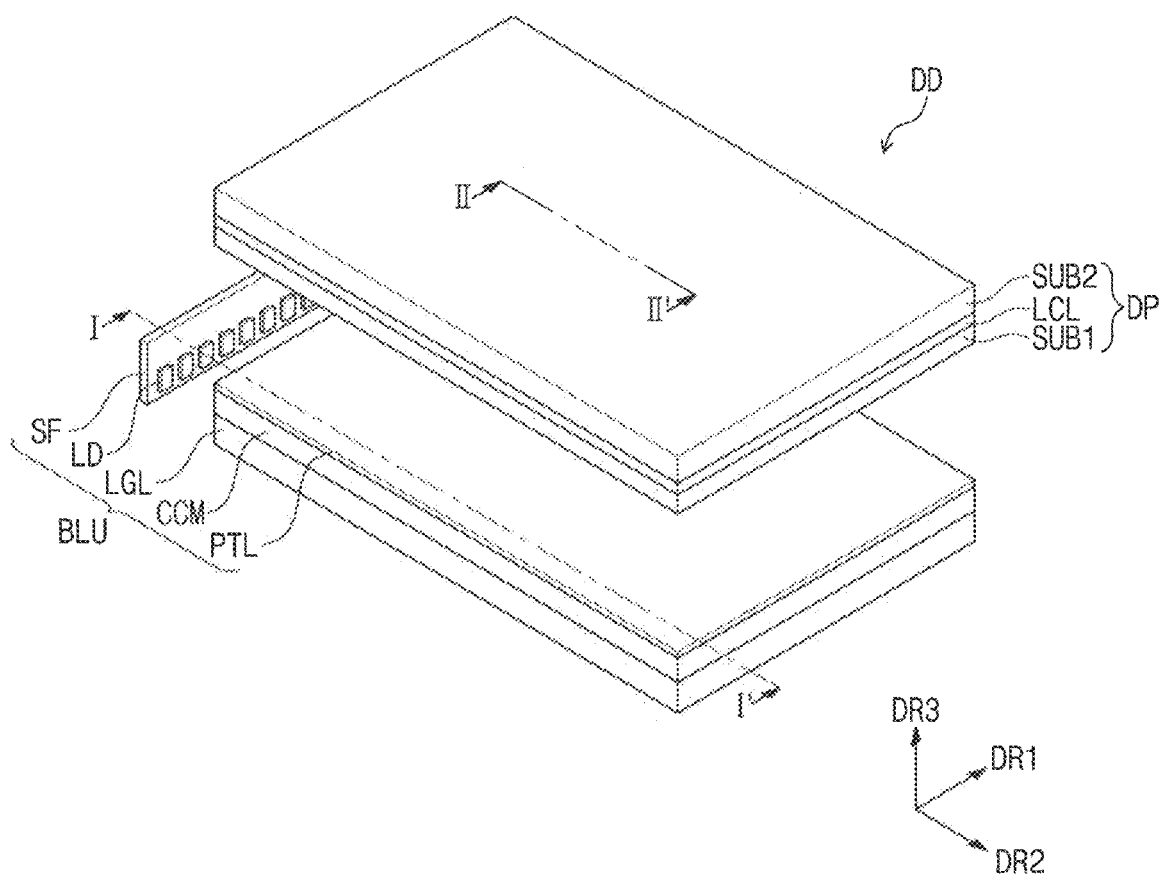
FIG. 1 is an exploded perspective view of a liquid crystal display device according to an exemplary embodiment of the present inventive concepts.

The present inventive concepts may be modified in many alternate forms, and thus exemplary embodiments will be illustrated in the drawings and described in detail. It should be understood, however, that the exemplary embodiments of the present inventive concepts are not intended to limit the inventive concepts to the particular forms disclosed, but rather, are intended to cover all modifications, equivalents, and alternatives falling within the spirit and scope of the invention.

Like reference numerals are used to refer to like elements in describing each drawing. Also, in the accompanying drawings, the dimensions of elements are exaggerated for clarity of the present inventive concepts. It will be understood that, although the terms "first", "second", etc. may be used herein to describe various elements, these elements should not be limited by these terms. These terms may only be used to distinguish one element from another. For example, a first element could be termed a second element, and, similarly, a second element could be termed a first element, without departing from the scope of exemplary embodiments of the present inventive concepts. The terms of a singular form may include plural forms unless the context clearly indicates otherwise.

In the present disclosure, it should be understood that the terms "comprise", or "have" are intended to specify the presence of stated features, integers, steps, operations, elements, components, or combinations thereof in the disclosure, but do not preclude the presence or addition of one or more other features, integers, steps, operations, elements, components, or combinations thereof.

In the present disclosure, if a portion such as a layer, a film, a region, or a plate is referred to as being "on" or "above" the other portion, it includes not only embodiments in which the portion is "directly on" the other portion, but also embodiments in which another portion is disposed therebetween. On the other hand, when a portion such as a layer, a film, a region, or a plate is referred to as being "under" or "below" the other portion, it includes not only embodiments in which the portion is "directly under" the other portion, but also embodiments in which another portion is disposed therebetween. In addition, in the present disclosure, being disposed "on" not only includes embodiments of being disposed above, but also the embodiments of being disposed below.

Meanwhile, in the present specification, "directly disposed" means that there is no layer, film, region, plate or the like added between a portion of a layer, a film, a region, a plate or the like and other portions. For example, being "directly disposed" may mean being disposed without additional members such as an adhesive member between two layers or two members.

Hereinafter, a backlight unit and a liquid crystal display device both according to an exemplary embodiment of the present inventive concepts will be described with reference to the accompanying drawings.

Figure 2:
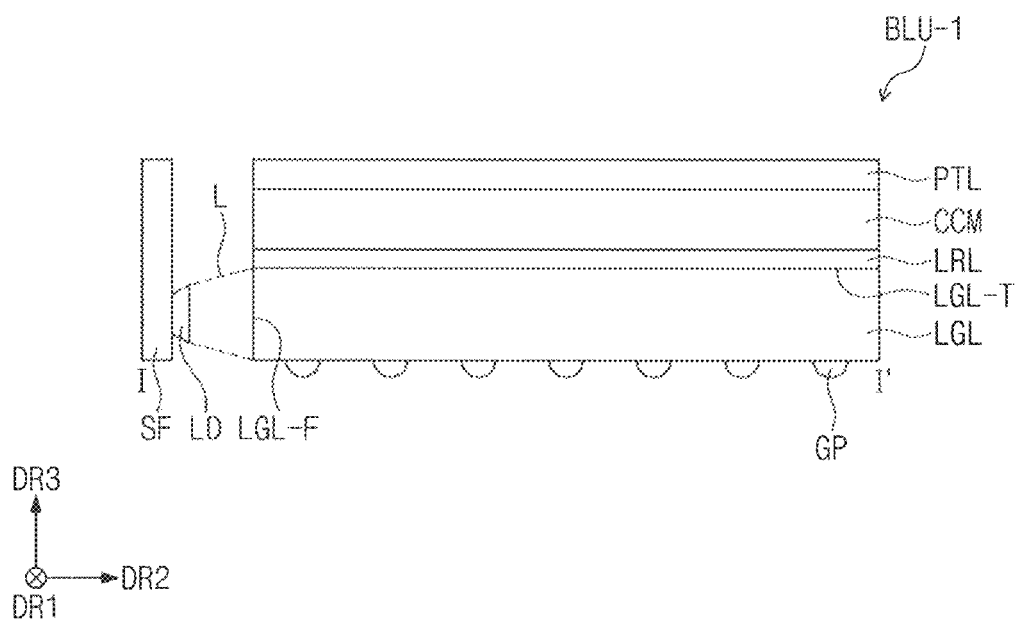
FIG. 2 is a cross-sectional view of a backlight unit taken along line I-I' of FIG. 1 according to an exemplary embodiment of the present inventive concepts.
Figure 3A:
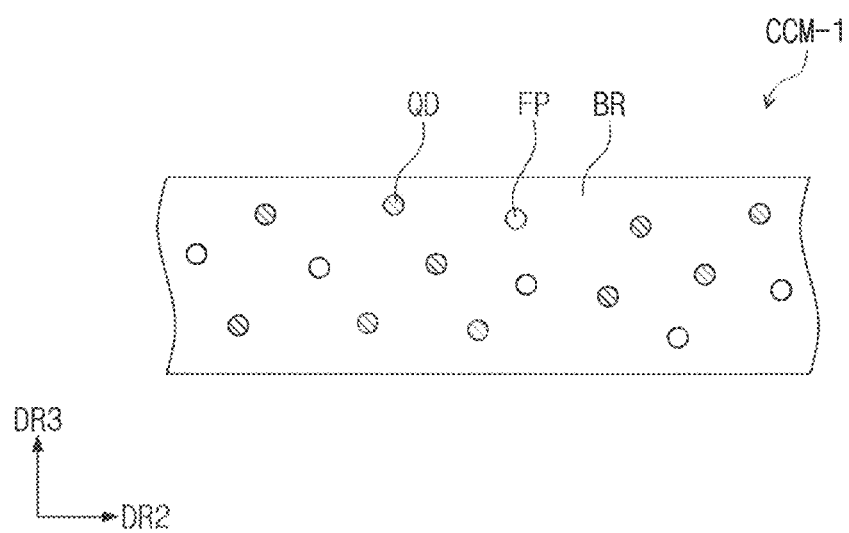
FIG. 3A and FIG. 3B are cross-sectional views showing a portion of a color control layer according to exemplary embodiments of the present inventive concepts.
Figure 3B:
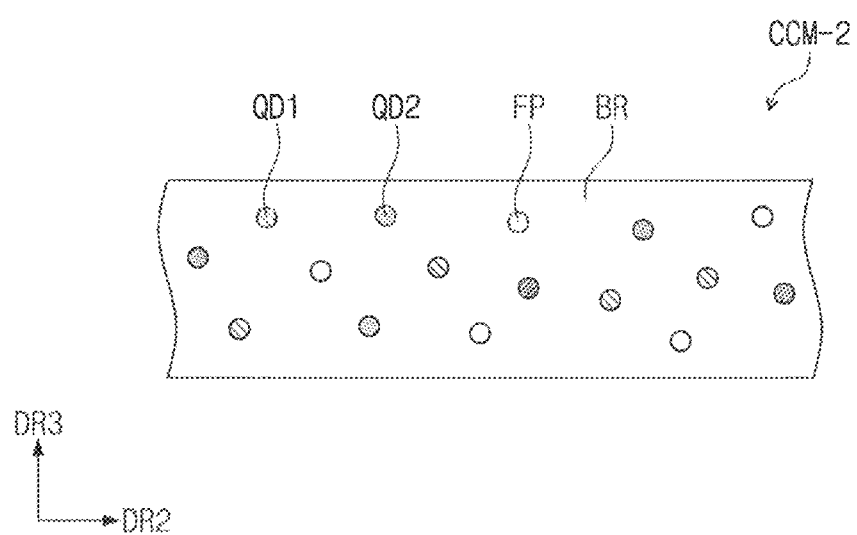

FIG. 1 is an exploded perspective view of a liquid crystal display device according to an exemplary embodiment of the present inventive concepts. FIG. 2 is a cross-sectional view of a backlight unit included in a liquid crystal display device according to an exemplary embodiment of the present inventive concepts. FIG. 3A and FIG. 3B are cross-sectional views showing a portion of a color control layer according to exemplary embodiments of the present inventive concept.

FIG. 1 illustrates a first direction axis DR1, a second direction axis DR2 and a third direction axis DR3. Directional axes described in the present specification are relative and may extend in different directions in other exemplary embodiments. For the convenience of explanation, in FIG. 1, a third direction axis DR3 may be defined as a direction in which the image is displayed from the display screen to the user. The first direction axis DR1 and the second direction axis DR2 are perpendicular to each other. The third direction axis DR3 may be perpendicular to a plane defined by the first direction axis DR1 and the second direction axis DR2.

Referring to FIG. 1, a liquid crystal display device DD of an exemplary embodiment may include a liquid crystal display panel DP and a backlight unit BLU. The backlight unit BLU may be disposed on at least one side of the liquid crystal display panel DP. For example, in the exemplary embodiment shown in FIG. 1, the backlight unit BLU is disposed on a bottom surface of the liquid crystal display panel DP and is arranged in the third direction DR3 with respect to the liquid crystal display panel.

The liquid crystal display panel DP displays images. As shown in the exemplary embodiment of FIG. 1, the liquid crystal display panel DP includes a first substrate SUB1 and a second substrate SUB2 facing each other. A liquid crystal layer LCL is disposed between the first substrate SUB1 and the second substrate SUB2.

The backlight unit BLU provides light to the liquid crystal display panel DP. The backlight unit BLU includes at least one light source LD that emits light for the liquid crystal display panel DP. In an exemplary embodiment, there may be a plurality of light sources LD and the plurality of light sources LD may be disposed on a support SF. A light guiding layer LGL guides the light emitted by the at least one light source LD in the direction of the liquid crystal display panel DP (e.g., in the third direction DR3). The backlight unit BLU also includes a color control layer CCM and a protection layer PTL.

In the present inventive concepts, the backlight unit BLU is an edge-type backlight unit. The edge-type backlight unit BLU may be configured such that the light source LD provides light to a side surface of the light guiding layer LGL from below the liquid crystal display panel DP and the light may be transmitted to the liquid crystal display panel DP through the light guiding layer.

In an exemplary embodiment, the liquid crystal display device DD may further include a housing that receives the liquid crystal display panel DP and the backlight unit BLU. The housing may be disposed in a manner to cover the backlight unit BLU and the liquid crystal display panel DP and to expose an upper surface of the second substrate SUB2 (e.g., a top surface in the third direction DR3) which is a display surface of the liquid crystal display panel. In addition, the housing may cover not only a side surface and a bottom surface of the liquid crystal display panel DP but also a portion of the second substrate SUB2, which is an upper surface. For example, the housing may cover edge portions of the upper surface of the second substrate SUB2, in the first direction DR1 and second direction DR2.

FIG. 2 is a cross-sectional view of a backlight unit BLU-1 taken along line I-I' of the liquid crystal display device DD shown in FIG. 1 in accordance with an exemplary embodiment. FIG. 2 shows a cross-section of the backlight unit BLU-1 on a plane defined by the second direction axis DR2 and the third direction axis DR3.

In an exemplary embodiment, the backlight unit BLU-1 may include a light guiding layer LGL having an incident surface LGL-F on which light is incident and an exit surface LGL-T from which the light is emitted, a light source LD adjacent to or disposed on the incident surface LGL-F of the light guiding layer LGL and configured to generate the light, a low refraction layer LRL disposed on the exit surface LGL-T of the light guiding layer LGL, a color control layer CCM disposed on the low refraction layer LRL, and a protection layer PTL disposed on the color control layer CCM. In FIG. 2, the light guiding layer LGL, the low refraction layer LRL, the color control layer CCM, and the protection layer PTL may be disposed by being sequentially laminated in the third direction axis DR3.

The light source LD disposed on the support SF emits light L to a surface of the light guiding layer LGL. In the exemplary embodiment shown in FIG. 2, the light L generated from the light source LD is incident on one side surface of the incident surface LGL-F. The one side surface of the incident surface LGL-F may be an edge surface of the incident surface defined in the first direction DR1 and the third direction DR3. The light L incident from the light source LD is transmitted to one side surface of the exit surface LGL-T, and then transmitted to the liquid crystal display panel DP. The one side surface of the exit surface LGL-T may be an edge surface defined in the first direction DR1 and the second direction DR2. In the exemplary embodiment shown in FIG. 2, the side surface of the incident surface LGL-F that the light L generated from the light source LD is incident thereon is perpendicular to the side surface of the exit surface LGL-T that the light is transmitted thereto.

In an exemplary embodiment, the light guiding layer LGL may be made of glass. However, exemplary embodiments of the present inventive concepts are not limited thereto. For example, in other embodiments, the light guiding layer LGL may be made of a polymer resin, and may be formed of a material including, for example, an acrylic resin or the like. The light guiding layer LGL may provide a substrate on which the low refraction layer LRL, the color control layer CCM, and the protection layer PTL, which are to be described later, are disposed.

The light guiding layer LGL may include a light guiding pattern portion GP. The light guiding pattern portion GP may be disposed on the opposite side of the exit surface LGL-T of the light guiding layer LGL in the third direction axis DR3. The light guiding pattern portion GP may transmit light emitted from the light source LD that is incident on the side surface of the light guiding layer LGL to another side surface of the light guiding layer LGL. Alternatively, the light guiding pattern portion GP may change the direction of the light so that the light is transmitted from the light guiding pattern portion in the direction of the exit surface LGL-T of the light guiding layer LGL.

In the cross-sectional view of FIG. 2, the light guiding pattern portion GP is illustrated as having a cross-section in a semicircular shape. However, exemplary embodiments of the present inventive concepts are not limited thereto. For example, in other exemplary embodiments, the light guiding pattern portion GP may have a cross-section having an inclined surface. In addition, unlike what is illustrated in FIG. 2, one or more of the plurality of light guiding pattern portions GP may have sizes that are different from each other. Additionally, the arrangement density of the light guiding pattern portions GP disposed on the light guiding layer LGL may be vary in different portions of the light guiding layer. For example, the density of the light guiding pattern portions GP may be relatively greater or less based on the distance from the light source LD. In one embodiment, the density of the light guiding pattern portions GP disposed on the light guiding layer LGL may be greater as the distance from the light source decreases.

The light guiding pattern portion GP may protrude from one side surface of the light guiding layer LGL (e.g., in the third direction DR3) and may be integrally formed with the light guiding layer LGL. However, in other exemplary embodiments, the light guiding pattern portion GP may be a concave pattern defined by being recessed from one side surface of the light guiding layer LGL in the third direction axis DR3 towards the exit surface LGL-T.

The low refraction layer LRL may be disposed on the light guiding layer LGL. In an exemplary embodiment, the low refraction layer LRL may be disposed directly on the light guiding layer LGL and may contact the exit surface LGL-T of the light guiding layer LGL. For example, the low refraction layer LRL may be formed by being coated on the exit surface LGL-T of the light guiding layer LGL. In exemplary embodiments, the coating method for forming the low refraction layer LRL may be slit coating, spin coating, roll coating, spray coating, ink jet printing, etc. However, the method for proving the low refraction layer LRL is not limited to being coated on the exit surface LGL-T of the light guiding layer LGL. In alternative embodiments, the low refraction layer LRL may be provided directly on the light guiding layer LGL by various other methods such as a transfer method.

The refractive index of the low refraction layer LRL may be lower than the refractive index of the light guiding layer LGL. The refractive index of the low refraction layer LRL may be lower than the refractive index of the light guiding layer LGL and the color control layer CCM. In an exemplary embodiment, the refractive index of the low refraction layer LRL may be 1.2 to 1.4. For example, the refractive index of the low refraction layer LRL may be 1.2 to 1.25. In an exemplary embodiment, the refractive index of the light guiding layer may be 1.4 to 1.8. The difference in refractive index between the low refraction layer LRL and the light guiding layer LGL may be 0.2 or greater.

The low refraction layer LRL may include any material having the above refractive index. For example, the low refraction layer LRL may include fine particles having voids, such as hollow silica.

Since the low refraction layer LRL has a lower refractive index than the light guiding layer LGL, light incident from the light source LD on the light guiding layer LGL may be effectively transmitted to the exit surface LGL-T of the light guiding layer LGL, which is relatively spaced apart from the light source LD. Since the low refraction layer LRL has a lower refractive index of 1.2 to 1.4 than the light guiding layer LGL, the total reflection is effectively performed at the boundary between the light guiding layer LGL and the low refraction layer LRL, so that light emitted from the light source LD may be effectively transmitted to the exit surface LGL-T of the light guiding layer LGL, which is relatively spaced apart from the light source LD.

The color control layer CCM may be disposed on the light guiding layer LGL and the low refraction layer LRL. For example, as shown in the exemplary embodiment of FIG. 2, the color control layer CCM may be disposed directly on the light guiding layer LGL. The color control layer CCM may change the color of light provided from the light source LD and transmits the light with the changed color to the liquid crystal layer LCL. For example, light provided from the light source LD may be changed into white light by the color control layer CCM and is then provided to the liquid crystal layer LCL as white light. The color control layer CCM will be described in detail with reference to FIG. 3A and FIG. 3B.

In the exemplary embodiment shown in FIG. 3A, a color control layer CCM-1 may include a base resin BR and a quantum dot QD. The quantum dot QD may be dispersed in the base resin BR.

The base resin BR is a medium in which at last one quantum dot QD is dispersed. The base resin BR may be formed of various resin compositions which may be generally referred to as a binder. However, exemplary embodiments of the present inventive concepts are not limited thereto. In the present specification, any medium may be referred to as the base resin BR regardless of the name, additional functions, composition materials, and the like thereof as long as the medium may disperse and dispose the quantum dot QD. The base resin BR may be a polymer resin. For example, the base resin BR may be an acrylic resin, a urethane-based resin, a silicone-based resin, or an epoxy resin, and the like. The base resin BR may be a transparent resin.

The quantum dot QD may be a particle for converting the wavelength of light provided from the light source LD (see FIG. 2). The quantum dot QD is a material having a crystal structure of a few nanometers in size, and is composed of hundreds to thousands of atoms. Due to the small size thereof, the quantum dot QD exhibits a quantum confinement effect in which an energy band gap is increased. When light of a wavelength having higher energy than a band gap is incident on the quantum dot QD, the quantum dot QD is excited by absorbing the light and falls to a ground state by emitting light of a specific wavelength. The wavelength of the emitted light has a value corresponding to the band gap. When the size and composition of the quantum dot QD is adjusted, light emitting properties caused by the quantum confinement effect may be adjusted.

A core of the quantum dot QD may be one or more compounds selected from a Group II-VI compound, a Group III-V compound, a Group IV-VI compound, a Group IV element, a Group IV compound, and a combination thereof.

The Group II-VI compound may be one or more compounds selected from the group consisting of: a binary compound selected from the group consisting of CdSe, CdTe, ZnS, ZnSe, ZnTe, ZnO, HgS, HgSe, HgTe, MgSe, MgS, and a mixture thereof; a ternary compound selected from the group consisting of AgInS, CuInS, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a quaternary compound selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof.

The Group III-V compound may be one or more compounds selected from the group consisting of: a binary compound selected from the group consisting of GaN, GaP, GaAs, GaSb, AlN, AlP, AlAs, AlSb, InN, InP, InAs, InSb, and a mixture thereof; a ternary compound selected from the group consisting of GaNP, GaNAs, GaNSb, GaPAs, GaPSb, AlNP, AlNAs, AlNSb, AlPAs, AlPSb, InGaP, InNP, InNAs, InNSb, InPAs, InPSb, GaAlNP, and a mixture thereof; and a quaternary compound selected from the group consisting of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof.

The Group IV-VI compound may be one or more compounds selected from the group consisting of: a binary compound selected from the group consisting of SnS, SnSe, SnTe, PbS, PbSe, PbTe, and a mixture thereof; a ternary compound selected from the group consisting of SnSeS, SnSeTe, SnSTe, PbSeS, PbSeTe, PbTe, SnPbS, SnPbSe, SnPbTe, and a mixture thereof; and a quaternary compound selected from the group consisting of SnPbSSe, SnPbSeTe, SnPbSTe, and a mixture thereof. The Group IV element may be selected from the group consisting of Si, Ge, and a mixture thereof. The IV group compound may be a binary compound selected from the group consisting of SiC, SiGe, and a mixture thereof.

The binary compound, the ternary compound, or the quaternary compound may be present in a particle with a uniform concentration distribution, or may be present in the same particle with a non-uniform concentration (e.g., either partially non-uniform or non-uniform throughout the entire core). In addition, a quantum dot may have a core/shell structure in which one quantum dot surrounds another quantum dot. An interface between a core and a shell may have a concentration gradient in which the concentration of an element present in the shell becomes lower toward the center.

In some exemplary embodiments, a quantum dot may have a core-shell structure that includes a core having nanocrystals and a shell surrounding the core which are described above. The shell of the quantum dot may provide a protection layer to prevent the chemical deformation of the core. The protection layer maintains the semiconductor properties of the quantum dot and/or a charging layer of the quantum dot which imparts electrophoresis properties. The shell may be a single layer or multiple layers. An interface between a core and a shell may have a concentration gradient in which the concentration of an element present in the shell becomes lower toward the center. In an exemplary embodiment, the shell of the quantum dot may be a metal or non-metal oxide, a semiconductor compound, or a combination thereof.

For example, the metal or non-metal oxide of the shell of the quantum dot may be one or more of a binary compound such as $SiO_2$, $Al_2O_3$, ZnO, MnO, $Mn_2O_3$, $Mn_3O_4$, CuO, FeO, $Fe_2O_3$, $Fe_3O_4$, CoO, $Co_3O_4$, and NiO, or a ternary compound such as $MgAl_2O_4$, $CoFe_2O_4$, $NiFe_2O_4$, and $CoMn_2O_4$. However, exemplary embodiments of the present inventive concepts are not limited thereto.

In an exemplary embodiment, the semiconductor compound may be one or more compounds selected from CdS, CdSe, CdTe, ZnS, ZnSe, ZnTe, ZnSeS, ZnTeS, GaAs, GaP, GaSb, HgS, HgSe, HgTe, InAs, InP, InGaP, InSb, AlAs, AlP, AlSb, or the like. However, exemplary embodiments of the present inventive concepts are not limited thereto.

A quantum dot may have a full width of half maximum (FWHM) of a light emission wavelength spectrum of about 45 nm or less. For example, the FWHM of the light emission spectrum of the quantum dot may be about 40 nm or less. The FWHM of the light emission spectrum of the quantum dot may be about 30 nm or less, and color purity or color reproducibility may be improved in the above range. In addition, light emitted through the quantum dots is emitted in all directions so that a wide viewing angle may be improved.

In addition, the quantum dot may be in the form of spherical, pyramidal, multi-arm, or cubic nanoparticles, nanotubes, nanowires, nanofibers, nanoparticles, and the like may be used. However, the form of the quantum dot is not particularly limited thereto.

A quantum dot may control the color of emitted light according to the particle size thereof. Accordingly the quantum dot may have various light emission colors such as blue, red, green, and the like.

In an embodiment, the color control layer CCM-1 may further include a scattering particle FP. In an exemplary embodiment, the scattering particle FP may be $TiO_2$ or a silica-based nanoparticle. The scattering particle FP may scatter light emitted from the quantum dot QD so that the light is transmitted outside of the color control layer CCM.

In the exemplary embodiment shown in FIG. 3B, a color control layer CCM-2 may include a plurality of quantum dots QD1 and QD2 which convert incident light into light having a different wavelength. For example, the color control layer CCM-2 includes a first quantum dot QD1 for converting incident light having a specific wavelength into light having a first wavelength and emitting the light. The color control layer CCM-2 also includes a second quantum dot QD2 that converts incident light having a specific wavelength into light having a second wavelength and emits the light.

For example, when the color control layer CCM-2 includes the plurality of quantum dots QD and light provided from the light source LD (see FIG. 2) is light of a blue light wavelength region, the first quantum dot QD1 may convert the blue light into light of a green light wavelength, and the second quantum dot QD2 may convert the blue light into light of a red light wavelength. For example, when light provided from the light source LD (see FIG. 2) is blue light having a maximum emission peak of 420-470 nm, the first quantum dot QD1 may emit green light having a maximum emission peak of 520 nm to 570 nm, and the second quantum dot QD2 may emit red light having a maximum emission peak of 620 nm to 670 nm. However, it should be understood that blue light, green light, and red light are not limited to the examples of wavelength regions presented above, but include all the wavelength regions that may be recognized as blue light, green light, and red light in the art. The combination of red light and green light emitted by the plurality of quantum dots along with blue light emitted from the light source may provide a white color for the color of the light emitted by the color control layer CCM-2.

Meanwhile, according to the particle size of the quantum dots QD1 and QD2, the color of emitted light may vary. The particle size of the first quantum dot QD1 and the particle size of the second quantum dot QD2 may be different from each other. For example, the particle size of the first quantum dot QD1 may be smaller than the particle size of the second quantum dot QD2. In this embodiment, the first quantum dot QD1 may emit light having a wavelength that is shorter than the light emitted by the second quantum dot QD2. However, in other embodiments, the second quantum dot QD2 may be smaller than the particle size of the first quantum dot QD1 and the second quantum dot QD2 may emit light having a wavelength that is shorter than the light emitted by the first quantum dot QD1.

Referring back to FIG. 2, the color control layer CCM may be disposed directly on the low refraction layer LRL. For example, in an exemplary embodiment, the color control layer CCM may be formed by being coated on the low refraction layer LRL. In exemplary embodiments, the method for coating the color control layer CCM on the low refraction layer LRL may be slit coating, spin coating, roll coating, spray coating, ink jet printing, etc. However, in alternative embodiments, the color control layer CCM may be disposed on the low refraction layer LRL by other methods. The color control layer CCM may be provided to a thickness of 0.5 μm to 100 μm. For example, the color control layer CCM may have a thickness in a range of 20 μm to 80 μm.

The protection layer PTL may be disposed on the color control layer CCM. For example, in the exemplary embodiment shown in FIG. 2, the protection layer PTL is disposed directly on the color control layer CCM. The protection layer PTL may protect the color control layer CCM. Hereinafter, the protection layer PTL will be described in detail with reference to FIG. 4A and FIG. 4B.

Figure 4A:
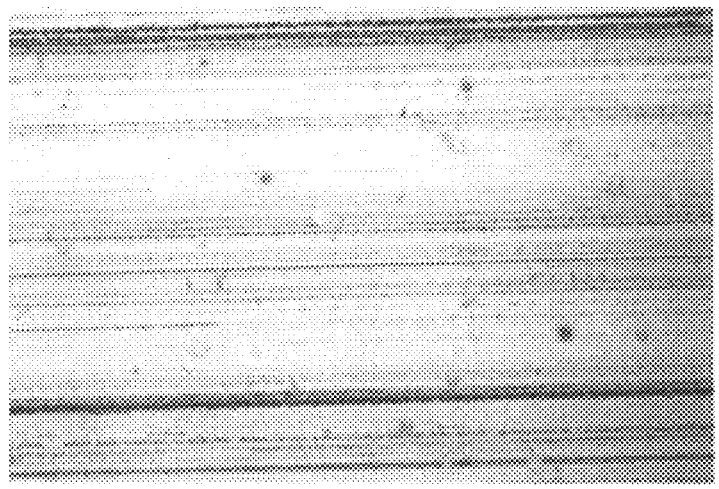
FIG. 4A is a photograph of a cross-section of a protection layer according to a Comparative Example after performance of an anti-wear properties evaluation thereon.
Figure 4B:
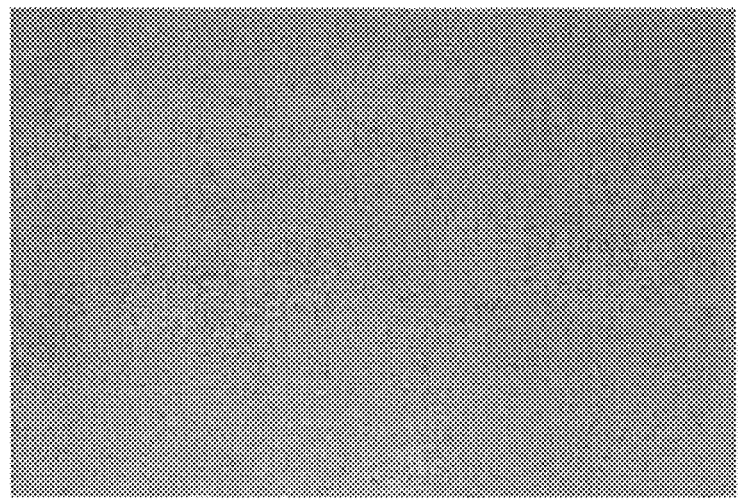
FIG. 4B is a photograph of a cross-section of a protection layer according to an exemplary embodiment of the present inventive concepts after performance of an anti-wear properties evaluation thereon.

FIG. 4A is a photograph of a cross-section of a protection layer according to a Comparative Example. FIG. 4B is a photograph of a cross-section of a protection layer including a resin composition including a repeating unit represented by Formula 1 according to an exemplary embodiment of the present inventive concepts.

In the present specification, -* indicates a position to be connected, such as a binding site to a neighboring atom.

In the present specification, "substituted or unsubstituted" may mean being substituted or unsubstituted with one or more substituents. The substituents may be selected from the group consisting of a deuterium atom, a halogen atom, a cyano group, a nitro group, an amine group, a silyl group, a boron group, a phosphine oxide group, a phosphine sulfide group, an alkyl group, an alkenyl group, an aryl group, and a hetero ring group. In addition, each of the substituents illustrated above may be substituted or unsubstituted. For example, a biphenyl group may be interpreted as an aryl group, and may be interpreted as a phenyl group substituted with a phenyl group.

In the present specification, examples of the halogen atom include a fluorine atom, a chlorine atom, a bromine atom or an iodine atom.

In exemplary embodiments, the number of carbon atoms of the amine group may be 1 to 30. However, the number of carbon atoms of the amine group is not particularly limited thereto. The amine group may include an alkylamine group and an arylamine group. Examples of the amine group include a methylamine group, a dimethylamine group, a phenylamine group, a naphthylamine group, a 9-methyl-anthracenylamine group, a triphenylamine group, and the like. However, the amine group is not limited to these examples.

In the present specification, the alkyl group may be linear, branched or cyclic. In exemplary embodiments, the number of carbon atoms of the alkyl group is 1 to 30, 1 to 20, 1 to 10, or 1 to 6. Examples of the alkyl group may include a methyl group, an ethyl group, an n-propyl group, an isopropyl group, an n-butyl group, an s-butyl group, a t-butyl group, an i-butyl group, a 2-ethylbutyl group, a 3,3-dimethylbutyl group, an n-pentyl group, an i-pentyl group, a neopentyl group, a t-pentyl group, a cyclopentyl group, a 1-methylpentyl group, a 3-methylpentyl group, a 2-ethylpentyl group, a 4-methyl-2-pentyl group, an n-hexyl group, a 1-methylhexyl group, a 2-ethylhexyl group, a 2-butylhexyl group, a cyclohexyl group, a 4-methylcyclohexyl group, a 4-t-butylcyclohexyl group, an n-heptyl group, a 1-methylheptyl group, a 2,2-dimethylheptyl group, a 2-ethylheptyl group, a 2-butylheptyl group, an n-octyl group, a t-octyl group, a 2-ethyloctyl group, a 2-butyloctyl group, a 2-hexyloctyl group, a 3,7-dimethyloctyl group, a cyclooctyl group, an n-nonyl group, an n-decyl group, an adamantly group, a 2-ethyldecyl group, a 2-butyldecyl group, a 2-hexyldecyl group, a 2-octyldecyl group, an n-undecyl group, an n-dodecyl group, a 2-ethyldodecyl group, a 2-butyldodecyl group, a 2-hexyldodecyl group, a 2-octyldodecyl group, an n-tridecyl group, an n-tetradecyl group, an n-pentadecyl group, an n-hexadecyl group, a 2-ethylhexadecyl group, a 2-butylhexadecyl group, a 2-hexylhexadecyl group, a 2-octylhexadecyl group, an n-heptadecyl group, an n-octadecyl group, an n-nonadecyl group, an n-eicosyl group, a 2-ethyleicosyl group, a 2-butyleicosyl group, a 2-hexyleicosyl group, a 2-octyleicosyl group, an n-heneicosyl group, an n-docosyl group, an n-tricosyl group, an n-tetracosyl group, an n-pentacosyl group, an n-hexacosyl group, an n-heptacosyl group, an n-octacosyl group, an n-nonacosyl group, and an n-triacontyl group, and the like. However, the alkyl group is not limited to these examples.

In the present specification, the alkenyl group may be linear or branched. In exemplary embodiments, the number of carbon atoms of the alkenyl group may be 2 to 30, 2 to 30, 2 to 20, or 2 to 10. However, the number of carbon atoms of the alkenyl group is not particularly limited thereto. Examples of the alkenyl group include a vinyl group, a 1-butenyl group, a 1-pentenyl group, a 1,3-butadienylaryl group, a styryl group, a styryl vinyl group, and the like. However, the alkenyl group is not limited to these examples.

In the present specification, the cycloalkyl group may be a ring-type alkyl group. In exemplary embodiments, the number of carbon atoms of the cycloalkyl group is 3 to 50, 3 to 30, 3 to 20, 3 to 12, or 1 to 6. Examples of the cycloalkyl group include a cyclopropyl group, a cyclobutyl group, a cyclopentyl group, a 3-methylcyclopentyl group, a 2,3-dimethylcyclopentyl group, a cyclohexyl group, a 3-methylcyclohexyl group, a 4-methylcyclohexyl group, a 2,3-dimethylcyclohexyl group, a 3,4,5-trimethylcyclohexyl group, a 4-tert-butylcyclohexyl group, a cycloheptyl group, a cyclooctyl group, and the like. However, the cycloalkyl group is not limited to these examples.

In the present specification, the heterocycloalkyl group may be a heterocycloalkyl group containing one or more of O, N, P, Si and S as a hetero atom. In exemplary embodiments, the number of carbon atoms of the heterocycloalkyl group is 2 to 50, 3 to 30, 3 to 20, 3 to 12, or 1 to 6. Examples of the heterocycloalkyl group include tetrahydrofuran, pyrrolidine, thiolane, tetrahydropyrane, and the like. However, the heterocycloalkyl group is not limited to these examples.

In the present specification, the aryl group means any functional group or substituent derived from an aromatic hydrocarbon ring. The aryl group may be a monocyclic aryl group or a polycyclic aryl group. In exemplary embodiments, the number of ring-forming carbon atoms of the aryl group may be 6 to 60, 6 to 30, 6 to 20, or 6 to 15. Examples of the aryl group may include a phenyl group, a naphthyl group, a fluorenyl group, an anthracenyl group, a phenanthryl group, a biphenyl group, a terphenyl group, a quaterphenyl group, a quinphenyl group, a sexiphenyl group, a biphenylene group, a triphenylene group, a pyrenyl group, a benzofluoranthenyl group, a chrysenyl group, and the like. However, the aryl group is not limited to these examples.

In the present specification, the heteroaryl group may be a heteroaryl group including one or more of B, O, N, P, Si, and S as a hetero atom. In exemplary embodiments, the number of ring-forming carbon atoms of the heteroaryl group may be 2 to 30 or 2 to 20. The heteroaryl group may be a monocyclic heteroaryl group or a polycyclic heteroaryl group. The polycyclic heteroaryl group may have, for example, a double ring or a triple ring structure. Examples of the heteroaryl group may include a thiophene group, a furan group, a pyrrole group, an imidazole group, a thiazole group, an oxazole group, an oxadiazole group, a triazole group, a pyridyl group, a bipyridyl group, a pyrimidyl group, a triazine group, a triazole group, an acridyl group, a pyridazine group, a pyrazinyl group, a quinolinol group, a quinazoline group, a quinoxalinyl group, a phenoxazyl group, a phthalazinyl group, a pyrido pyrimidinyl group, a pyrido pyrazinyl group, a pyrazino pyrazinyl group, an isoquinoline group, an indole group, a carbazole group, an N-arylcarbazole group, an N-heteroarylcarbazole group, an N-alkylcarbazole group, a benzoxazole group, a benzoimidazole group, a benzothiazole group, a benzocarbazole group, a benzothiophene group, a dibenzothiophenyl group, a thienothiophene group, a benzofuranyl group, a phenanthroline group, a thiazolyl group, an isoxazolyl group, an oxadiazolyl group, a thiadiazolyl group, a benzothiazolyl group, a phenothiazinyl group, a dibenzosilole group, a dibenzofuranyl group, and the like. However, the heteroaryl group is not limited to these examples.

In exemplary embodiments, the number of ring-forming carbon atoms of the aryloxy group may be 6 to 30, 6 to 20, or 6 to 15. Specific examples of the aryloxy group include phenoxy, naphthoxy, anthracenyloxy, phenanthrenyloxy, fluorenyloxy, indenyloxy, and the like. However, the aryloxy group is not limited thereto.

In an exemplary embodiment, the protection layer may include a resin composition including polysilsesquioxane. Specifically, the resin composition includes a first repeating unit represented by Formula 1 below.

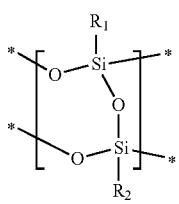

[Formula 1]

In Formula 1, $R_1$ and $R_2$ are each independently selected from a hydrogen atom, a deuterium atom, a halogen atom, a substituted or unsubstituted amine group, a substituted or unsubstituted epoxy group, a substituted or unsubstituted thiol group, an acrylic group, a methacrylic group, an isocyanate group, a nitrile group, a nitro group, a substituted or unsubstituted alkyl group having 1 to 10 carbons, a substituted or unsubstituted alkenyl group having 2 to 10 carbon atoms, a substituted or unsubstituted alkoxy group having 1 to 40 carbon atoms, a substituted or unsubstituted cycloalkyl group having 3 to 12 ring-forming carbon atoms, a substituted or unsubstituted heterocycloalkyl group having 2 to 12 ring-forming carbon atoms, a substituted or unsubstituted aryl group having 6 to 30 ring-forming carbon atoms, a substituted or unsubstituted heteroaryl group having 2 to 30 ring-forming carbon atoms, a substituted or unsubstituted aralkyl group having 6 to 12 ring-forming carbon atoms, a substituted or unsubstituted aryloxy group having 6 to 12 ring-forming carbon atoms, or a substituted or unsubstituted aryl thiol group having 6 to 12 ring-forming carbon atoms. The acrylic group may be substituted or unsubstituted acrylic group. The methacrylic group may be substituted or unsubstituted methacrylic group. The isocyanate group may be substituted or unsubstituted isocyanate group.

Each of the $R_1$ and $R_2$ in a repeating unit of Formula 1 may be different from the respective $R_1$ and $R_2$ in a prior repeating unit or a subsequent repeating unit. However, each of the $R_1$ and $R_2$ in a repeating unit may also be the same as the respective $R_1$ and $R_2$ of a prior repeating unit or a subsequent repeating unit.

The protection layer PTL may have increased strength by including the resin composition including the first repeating unit represented by Formula 1. The protection layer PTL with increased strength may effectively protect the color control layer CCM which is susceptible to scratches and other damage during the performance of manufacturing processes and various other processes. A scratched or damaged color control layer CCM may result in deterioration of the quantum dots due to penetration of external oxygen and/or moisture. The deterioration of the quantum dots of the color control layer CCM may result in the generation of black spots or white spots in the image provided by the liquid crystal display device. The protection layer PTL of the present inventive concepts may effectively protect the color control layer CCM and prevent the generation of scratches and the like in the color control layer CCM during the manufacturing processes and various other processes.

In an exemplary embodiment, the protection layer PTL may include a resin composition including two or more kinds of polysilsesquioxanes having different repeating units. For example, the resin composition may further include a second repeating unit represented by Formula 2 below.

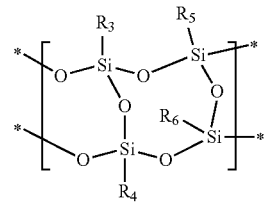

[Formula 2]

In Formula 2, $R_3$ to $R_6$ are each independently selected from a hydrogen atom, a deuterium atom, a halogen atom, a substituted or unsubstituted amine group, a substituted or unsubstituted epoxy group, a substituted or unsubstituted thiol group, an acrylic group, a methacrylic group, an isocyanate group, a nitrile group, a nitro group, a substituted or unsubstituted alkyl group having 1 to 10 carbons, a substituted or unsubstituted alkenyl group having 2 to 10 carbon atoms, a substituted or unsubstituted alkoxy group having 1 to 40 carbon atoms, a substituted or unsubstituted cycloalkyl group having 3 to 12 ring-forming carbon atoms, a substituted or unsubstituted heterocycloalkyl group having 2 to 12 ring-forming carbon atoms, a substituted or unsubstituted aryl group having 6 to 30 ring-forming carbon atoms, a substituted or unsubstituted heteroaryl group having 2 to 30 ring-forming carbon atoms, a substituted or unsubstituted aralkyl group having 6 to 12 ring-forming carbon atoms, a substituted or unsubstituted aryloxy group having 6 to 12 ring-forming carbon atoms, or a substituted or unsubstituted aryl thiol group having 6 to 12 ring-forming carbon atoms. The acrylic group may be substituted or unsubstituted acrylic group. The methacrylic group may be substituted or unsubstituted methacrylic group. The isocyanate group may be substituted or unsubstituted isocyanate group. $R_3$ to $R_6$ of Formula 2 may be different from each other or the same as each other in each repeating unit.

In a resin composition including the first repeating unit and the second repeating unit, the mole ratio of the first repeating unit and the second repeating unit may be 1:1000 to 1000:1.

In an exemplary embodiment, the resin composition may further include a third repeating unit represented by Formula 3 below.

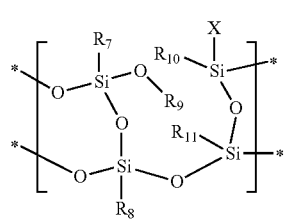

[Formula 3]

In Formula 3, X is either $OR_{12}$ or $O(SiO_{3/2}R_{13})_{4+2n}$, and $R_7$ to $R_{13}$ are each independently selected from a hydrogen atom, a deuterium atom, a halogen atom, a substituted or unsubstituted amine group, a substituted or unsubstituted epoxy group, a substituted or unsubstituted thiol group, an acrylic group, a methacrylic group, an isocyanate group, a nitrile group, a nitro group, a substituted or unsubstituted alkyl group having 1 to 10 carbons, a substituted or unsubstituted alkenyl group having 2 to 10 carbon atoms, a substituted or unsubstituted alkoxy group having 1 to 40 carbon atoms, a substituted or unsubstituted cycloalkyl group having 3 to 12 ring-forming carbon atoms, a substituted or unsubstituted heterocycloalkyl group having 2 to 12 ring-forming carbon atoms, a substituted or unsubstituted aryl group having 6 to 30 ring-forming carbon atoms, a substituted or unsubstituted heteroaryl group having 2 to 30 ring-forming carbon atoms, a substituted or unsubstituted aralkyl group having 6 to 12 ring-forming carbon atoms, a substituted or unsubstituted aryloxy group having 6 to 12 ring-forming carbon atoms, or a substituted or unsubstituted aryl thiol group having 6 to 12 ring-forming carbon atoms. n is an integer of 0 or more. The acrylic group may be substituted or unsubstituted acrylic group. The methacrylic group may be substituted or unsubstituted methacrylic group. The isocyanate group may be substituted or unsubstituted isocyanate group. $R_7$ to $R_{13}$ of Formula 3 may be different from each other or the same as each other in each repeating unit.

In a resin composition including the first repeating unit and the third repeating unit, the mole ratio of the first repeating unit and the third repeating unit may be 1:1000 to 1000:1.

In an exemplary embodiment, a resin composition may include a first repeating unit, a second repeating unit, and a third repeating unit. In a resin composition including the first repeating unit, the second repeating unit and the third repeating unit, the mole ratio of each of the first repeating unit, second repeating unit and the third repeating unit with respect to the other two units may be between 1:1000:1000 to 1000:1:1.

In an exemplary embodiment, the protection layer PTL may further include a silica particle. The protection layer PTL including a silica particle may have improved strength. The size of the silica particle may be 50 nm to 15 μm, but is not limited thereto.

In an exemplary embodiment, the resin composition may be either a thermosetting resin or a photo-curable resin. The resin composition may include a thermosetting or photo-curable functional group. For example, the thermosetting or photo-curable functional group may be an acrylic group or a methacrylic group. However, exemplary embodiments are not limited thereto.

The protection layer PTL may be formed by applying a resin composition and then subjecting the same to a thermal-setting or photo-curing process. The protection layer PTL may be provided to a thickness of 1 μm to 10 μm. The thickness may be the length from a top surface to a bottom surface of the protection layer PTL in the third direction DR3.

Table 1 are the results of measuring the pencil hardness of a protection layer according to Examples and Comparative Example. The pencil hardness was measured by setting the moving speed of a pencil at 1 mm/sec when the contact angle of the pencil was 45 degrees with a load of 1 kg. FIG. 4A and FIG. 5B are photographs of cross-sections of protection layers according to Examples and a Comparative Example after conducting an anti-wear properties test on each cross-section thereof. FIG. 4A is a photograph of a cross-section of a protection layer according to the Comparative Example, and FIG. 4B is a photograph of a cross-section of a protection layer according to an exemplary embodiment of the present invention. The anti-wear properties were evaluated according to whether there is a scratch after reciprocating the steel wool #0000 10 times under a load of 1.5 kg.

TABLE 1

| Protection Layer | Materials | Pencil hardness |
|---|---|---|
| Example 1 | Resin composition including repeating unit represented by Formula 1 | 5 H |
| Example 2 | Resin composition including repeating unit represented by Formula 1 and repeating unit represented by Formula 2 | 5 H |
| Example 3 | Resin composition including repeating unit represented by Formula 1 and repeating unit represented by Formula 3 | 6 H |
| Example 4 | Resin composition including repeating unit represented by Formula 1, repeating unit represented by Formula 2, and repeating unit represented by Formula 3 | 6 H |
| Comparative Example | Polyimide resin | 1 H |

The protection layer according to the Comparative Example includes a polyimide resin that is typically used as a protection film of a color control layer in the relevant art. As shown in Table 1, the pencil hardness of the protection layer according to the Comparative Example was measured to be 1 H. The photograph shown in FIG. 4A indicates that the protection layer of the Comparative Example has a plurality of scratches as a result of the anti-wear properties evaluation.

On the other hand, the protection layers according to Examples 1 to 4 were all measured to have a pencil hardness of 5 H or greater. The photograph shown in FIG. 4B indicates that the protection layer according to an exemplary embodiment of the present inventive concepts which includes a resin composition containing a repeating unit represented by Formula 1 had no scratches based on the result of the anti-wear properties evaluation. Accordingly, the protection layer according to the exemplary embodiment of the present inventive concept has increased strength, and thus, is able to effectively protect a color control layer.

Referring back to FIG. 2, the protection layer PTL may be disposed directly on the color control layer CCM. However, exemplary embodiments of the present inventive concepts are not limited thereto. For example, a barrier layer may be disposed between the protection layer PTL and the color control layer CCM. The protection layer PTL may be disposed in the outermost region of the backlight unit BLU to serve as a protection layer. For example, the protection layer PTL may be disposed on the top edge of the backlight unit BLU defined by the first direction DR1 and the second direction DR2.

Figure 5A:
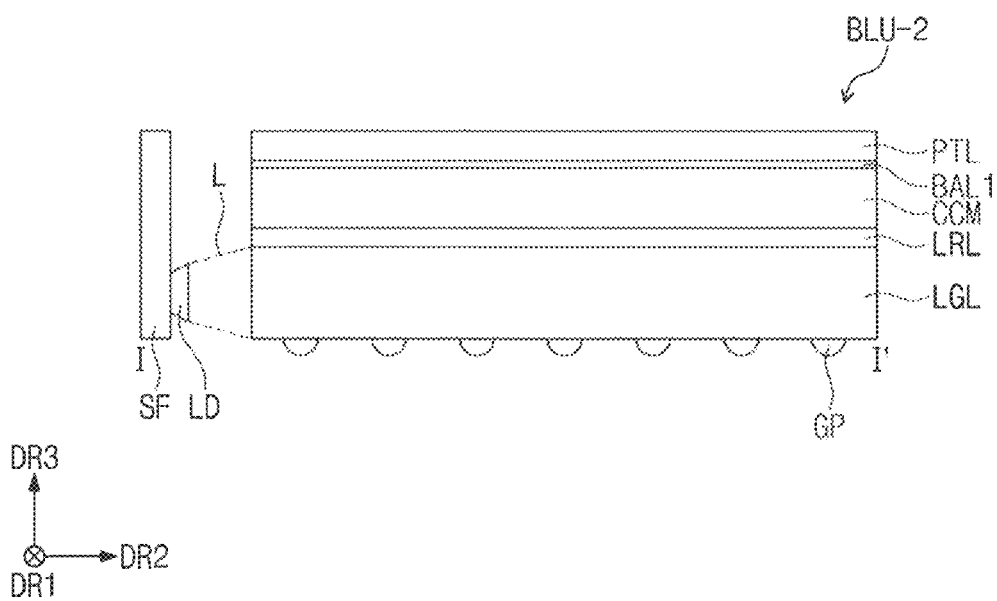
FIG. 5A and FIG. 5B are cross-sectional views showing a backlight unit taken along line I-I' according to exemplary embodiments of the present inventive concepts.
Figure 5B:
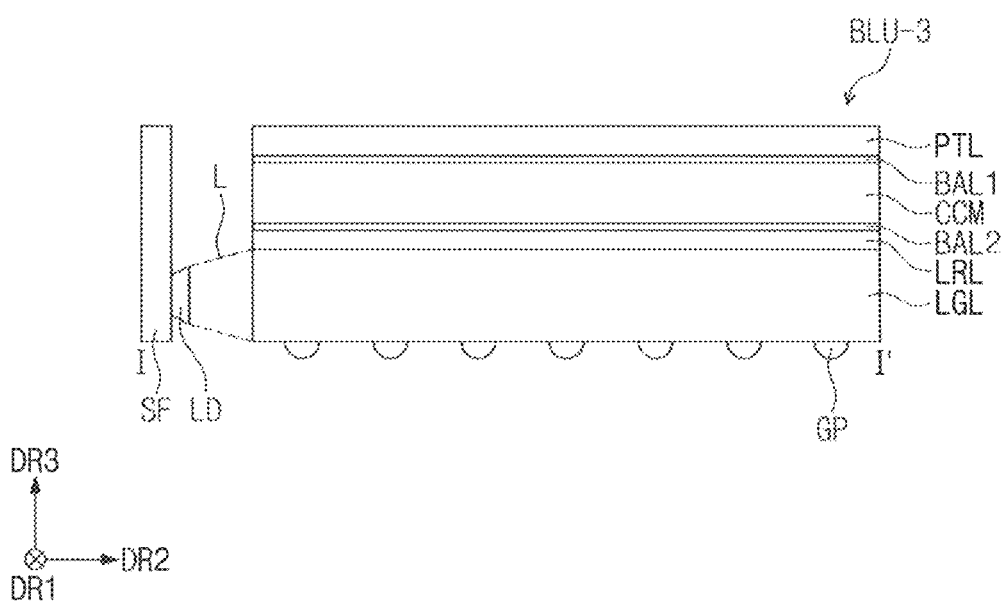

FIG. 5A and FIG. 5B are cross-sectional views showing a backlight unit according to an exemplary embodiment of the present inventive concepts. Backlight units BLU-2 and BLU-3 of exemplary embodiments shown in FIG. 5A and FIG. 5B differ from the backlight unit BLU-1 of the exemplary embodiment shown in FIG. 2 due to the inclusion of barrier layers BAL1 and BAL2. Hereinafter, detailed descriptions of the same compositions as those described with reference to FIG. 1 to FIG. 4B will be omitted.

The backlight units BLU-2 and BLU-3 may further include at least one of the barrier layers BAL1 and BAL2. At least one of the barrier layers BAL1 and BAL2 may be disposed adjacent to one surface of the color control layer CCM. For example, each of the barrier layers BAL1 and BAL2 may be disposed on one of the opposing edge surfaces of the backlight unit BLU defined by the first direction DR1 and the second direction DR2 and which are spaced apart in the third direction DR3.

The barrier layers BAL1 and BAL2 prevent the penetration of moisture and/or oxygen. The barrier layers BAL1 and BAL2 may include at least one inorganic layer. The barrier layers BAL1 and BAL2 may be formed by including an inorganic material. For example, the barrier layers BAL1 and BAL2 may be formed by including silicon nitride, aluminum nitride, zirconium nitride, titanium nitride, hafnium nitride, tantalum nitride, silicon oxide, aluminum oxide, titanium oxide, tin oxide, cerium oxide and silicon oxynitride, or a metal thin film having light transmittance, and the like. However, exemplary embodiments of the present inventive concepts are not limited thereto. The barrier layers BAL1 and BAL2 may further include an organic film. The barrier layers BAL1 and BAL2 may each be formed of a single layer or a plurality of layers (e.g., a plurality of laminated layers arranged in the third direction DR3).

In the exemplary embodiment shown in FIG. 5A, a backlight unit BLU-2 may include a first barrier layer BAL1 disposed between the color control layer CCM and the protection layer PTL. The first barrier layer BAL1 may be disposed directly on the color control layer CCM, or may be in contact with the protection layer PTL. The first barrier layer BAL1 is illustrated as being a single layer. However, exemplary embodiments of the present inventive concepts are not limited thereto. The first barrier layer BAL1 may include a plurality of layers. When the first barrier layer BAL1 includes a plurality of layers, the first barrier layer BAL1 may include a plurality of inorganic films, or may include both an inorganic film and an organic film.

In the exemplary embodiment shown in FIG. 5B, a backlight unit BLU-3 may include the first barrier layer BAL1 disposed between the color control layer CCM and the protection layer PTL. The backlight unit BLU-3 further includes a second barrier layer BAL2 disposed between the low refraction layer LRL and the color control layer CCM. The second barrier layer BAL2 may be disposed directly on the low refraction layer LRL, or may be in contact with the color control layer CCM. The second barrier layer BAL2 is illustrated as being a single layer. However, exemplary embodiments of the present inventive concepts are not limited thereto. The second barrier layer BAL2 may include a plurality of layers. When the second barrier layer BAL2 includes a plurality of layers, the second barrier layer BAL2 may include a plurality of inorganic films, or may include both an inorganic film and an organic film.

Figure 6:
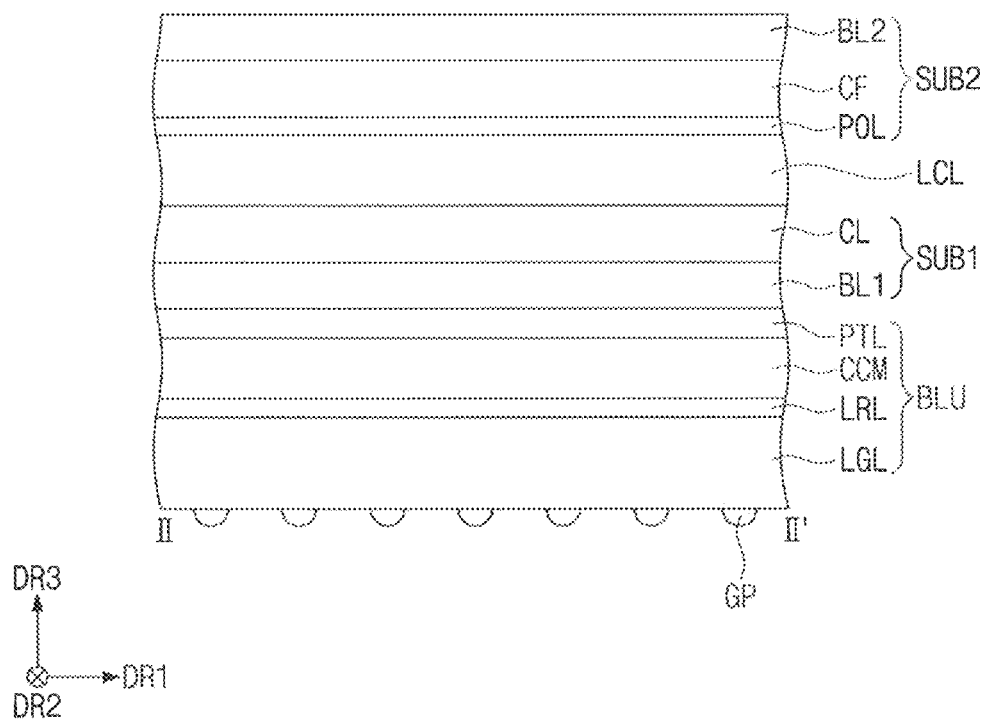
FIG. 6 is a cross-sectional view of a liquid crystal display taken along line II-II' of FIG. 1 according to an exemplary embodiment of the present inventive concepts.
Figure 7:
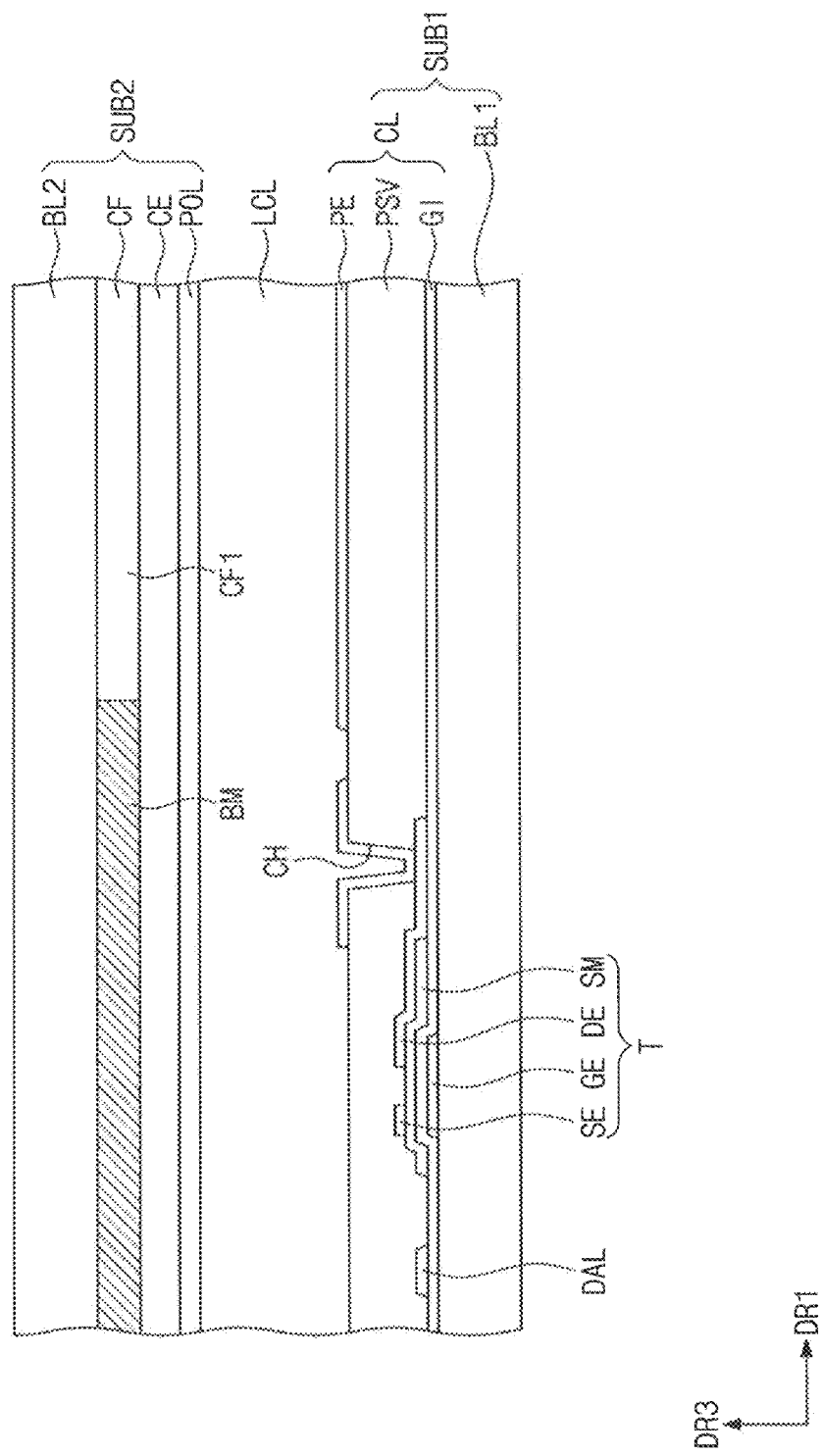
FIG. 7 is a cross-sectional view of a liquid crystal display panel according to an exemplary embodiment of the present inventive concepts.

FIG. 6 is a cross-sectional view of a liquid crystal display taken along line II-II' of FIG. 1 according to an exemplary embodiment of the present inventive concepts. FIG. 7 is a cross-sectional view of a liquid crystal display panel according to an exemplary embodiment of the present inventive concepts.

In the exemplary embodiment shown in FIG. 6, the backlight unit BLU includes the light guiding layer LGL, the low refraction layer LRL disposed on the light guiding layer, the color control layer CCM disposed on the low refraction layer, and the protection layer PTL disposed on the color control layer. A first substrate SUB1 is disposed on the backlight unit BLU. The first substrate SUB1 includes a first base substrate BL1 and a circuit layer CL. A second substrate SUB2 is disposed on a liquid crystal layer LCL. The second substrate SUB2 includes a second base substrate BL2, a color filter layer CF, and a polarizing layer POL. The liquid crystal layer LCL is disposed between the first substrate SUB1 and the second substrate SUB2.

In the exemplary embodiment shown in FIG. 7, a liquid crystal display panel includes the first substrate SUB1 and the second substrate SUB2 disposed spaced apart from each other. For example, the first substrate SUB1 and the second substrate SUB2 may be spaced apart from each other in the third direction DR3. The liquid crystal layer LCL is disposed between the first substrate SUB1 and the second substrate SUB2. However, the structure of the liquid crystal display panel is not limited thereto. For example, the first base substrate BL1 and the second base substrate BL2 may be reversed.

The first substrate SUB1 is disposed on the first base substrate BL1, and may include the circuit layer CL disposed closer (e.g., in the third direction DR3) to the liquid crystal layer LCL than the first base substrate BL1.

The first base substrate BL1 may be a polymer substrate, a plastic substrate, a glass substrate, or a quartz substrate. The first base substrate BL1 may be a transparent insulation substrate. The first base substrate BL1 may be rigid or flexible. The first base substrate BL1 may provide a base material on which the circuit layer CL and the like are disposed.

The circuit layer CL may include a gate line, a storage line, and an electrode forming an electric field in the liquid crystal layer LCL. A transistor T includes a gate electrode GE, an activation unit overlapping the gate electrode GE, a source electrode SE connected to a data line DAL, and a drain electrode DE disposed spaced apart (e.g., in the first direction DR1) from the source electrode SE. A semiconductor pattern SM is provided on the gate electrode GE having a gate insulation film GI interposed therebetween. Some regions of the semiconductor pattern SM overlap the gate electrode GE. The semiconductor pattern SM includes an active pattern provided on the gate insulation film GI and an ohmic contact layer formed on the active pattern. The ohmic contact layer includes ohmic contacts between the active pattern, the source electrode SE, and the drain electrode DE, respectively.

The source electrode SE is branched from the data lines DAL. The source electrode SE is formed on the ohmic contact layer and some regions of the source electrode SE overlap the gate electrode GE. The data line DAL may be disposed in a region of the gate insulation film GI on which the semiconductor pattern SM is not disposed.

The drain electrode DE is provided spaced apart (e.g., in the first direction DR1) from the source electrode SE having the semiconductor pattern SM interposed therebetween. The drain electrode DE is formed on the ohmic contact layer and a region of the drain electrode DE is provided to overlap (e.g., in the third direction DR3) the gate electrode GE.

Accordingly, an upper surface of the active pattern between the source electrode SE and the drain electrode DE is exposed, and becomes a channel portion defining a conduction channel between the source electrode SE and the drain electrode DE depending on whether a voltage is applied to the gate electrode GE. The source electrode SE and the drain electrode DE overlap (e.g., in the third direction DR3) a portion of the semiconductor pattern SM in a region except for the channel portion which is formed spaced apart between the source electrode SE and the drain electrode DE.

A pixel electrode PE is connected to the drain electrode DE having a protection film PSV interposed therebetween. The protection film PSV covers the source electrode SE, the drain electrode DE, the channel portion, and the gate insulation film GI, and has a contact hole CH which exposes a portion of the drain electrode DE. The protection film PSV may include, for example, silicon nitride or silicon oxide. However, exemplary embodiments of the protection film PSV are not limited thereto. The pixel electrode PE is connected to the drain electrode DE through the contact hole CH formed on the protection film PSV. The pixel electrode PE is formed of a transparent conductive material.

The liquid crystal layer LCL is disposed between the first substrate SUB1 and the second substrate SUB2, and includes a plurality of liquid crystal molecules. The liquid crystal molecules having a dielectric anisotropy are arranged in the liquid crystal layer LCL. In the liquid crystal layer LCL, any liquid crystal molecule may be used without particular limitation. For example, an alkenyl-based liquid crystal compound or an alkoxy-based liquid crystal compound may be used as the liquid crystal molecule. The liquid crystal molecule used in an exemplary embodiment may have a negative dielectric anisotropy, but the exemplary embodiments of the present inventive concepts are not limited thereto. For example, a liquid crystal molecule having a positive dielectric anisotropy may be used.

One or more insulation layers may be disposed on one surface of the first base substrate BL1. An alignment film may also be disposed between the first base substrate BL1 and the liquid crystal layer LCL. The alignment film may control the alignment angle of a liquid crystal injected into the liquid crystal layer LCL.

The second substrate SUB2 may include the second base substrate BL2 and the color filter layer CF, a common electrode CE, and the polarizing layer POL disposed on a lower surface (e.g., in the third direction DR3) of the second base substrate BL2.

The second base substrate BL2 may be a polymer substrate, a plastic substrate, a glass substrate, or a quartz substrate. The second base substrate BL2 may be a transparent insulation substrate. The second base substrate BL2 may be rigid or flexible. The second base substrate BL2 may provide a base material on which the color filter layer CF and the like are disposed.

The color filter layer CF may be disposed on a lower surface of the second base substrate BL2. The color filter layer CF may include a filter CF1 for transmitting light of a predetermined wavelength region. A plurality of color filter layers CF may include a plurality of filters, in which case, each filter may transmit light of different wavelength regions. For example, the color filter layer CF may include a red filter, a green filter, and a blue filter. However, exemplary embodiments of the present inventive concept are not limited thereto.

The color filter layer CF may further include a light blocking unit BM for preventing a light leakage phenomenon by blocking light. The light blocking unit BM may be a black matrix. The light blocking unit BM may include an organic light blocking material or an inorganic light blocking material both including a black pigment or a black dye. In exemplary embodiments in which the color filter layer CF includes a plurality of filters, the light blocking unit BM may be disposed between neighboring filters to separate such filters. The light blocking unit BM may be disposed overlapping the boundaries of the neighboring filters.

The common electrode CE may be disposed on a lower side (e.g., in the third direction DR3) of the color filter layer CF. The common electrode CE is illustrated as being disposed directly on a lower surface of the color filter layer CF. However, exemplary embodiments of the present inventive concepts are not limited thereto. For example, at least one insulation layer may further be disposed between the common electrode CE and the color filter layer CF. The common electrode CE controls the liquid crystal layer LCL by forming an electric field with the pixel electrode PE. In an exemplary embodiment of the present inventive concepts, the common electrode CE is illustrated as being disposed on the second base substrate BL2. However, exemplary embodiments of the present inventive concept are not limited thereto. The common electrode CE may be disposed on the first base substrate BL1.

The polarizing layer POL may be disposed on a lower side (e.g., in the third direction DR3) of the common electrode CE. The polarizing layer POL may be a coated-type polarizing layer, or may be formed by deposition. Alternatively, the polarizing layer POL may be a film-type polarizing member which has been separately prepared and provided on the second base substrate BL2. However, exemplary embodiments of the present inventive concepts are not limited thereto. For example, the display panel may include one or more polarizing layers POL, or may not include the polarizing layer POL. In the exemplary embodiment shown in FIG. 7, the polarizing layer POL is illustrated as being disposed on the second base substrate BL2. However, exemplary embodiments of the present inventive concepts are not limited thereto. For example, the polarizing layer POL may be disposed between the color filter layer CF and the second base substrate BL2. Alternatively, the polarizing layer POL may be disposed inside the first substrate SUB1, on a lower portion of the first substrate SUB1, or on an upper portion of the second substrate SUB2. In addition, the polarizing layer POL may include a polarizer layer and at least one protection layer for protecting the polarizer layer.

In the present embodiment, a liquid crystal display panel in a vertical alignment mode is exemplarily described. However, in an exemplary embodiment of the present inventive concepts, a liquid crystal display panel in any of an in-plane switching mode, a fringe-field switching (FFS) mode, a Plane to Line Switching (PLS) mode, a Super Vertical Alignment (SVA) mode, or a Surface-Stabilized Vertical Alignment (SS-VA) mode may be applied.

Meanwhile, exemplary embodiments of a liquid crystal display panel described with reference to FIG. 1, FIG. 6 and FIG. 7 are exemplary. The configuration of each of the first substrate SUB1 and the second substrate SUB2 may be modified in various ways within the scope of the present inventive concepts.

The backlight unit of exemplary embodiments described above and the liquid crystal display device including the same include a light guiding layer, a color control layer, and a protection layer, thereby effectively protecting the color control layer. Therefore, reliability problems caused by the exposure of the color control layer to the external environment may be prevented. Furthermore, since the color control layer including quantum dots is introduced into the backlight unit, the display quality may be improved.

Exemplary embodiments of the present inventive concepts may provide a backlight unit having improved reliability by protecting a color control layer from external environment.

Exemplary embodiments of the present inventive concepts may provide a liquid crystal display device having excellent color reproducibility and display quality.

Although the present inventive concepts have been described with reference to a preferred embodiment of the inventive concepts, it will be understood by those skilled in the art that various changes in form and details may be made therein without departing from the spirit and scope of the present inventive concepts.

Accordingly, the technical scope of the present inventive concepts is not intended to be limited to the contents set forth in the detailed description of the specification, but is intended to be defined by the appended claims.

What is claimed is:

1. A blacklight unit comprising:
  a light guiding layer including an incident surface on which light is incident and an exit surface from which light is emitted;
  a light source disposed on the incident surface of the light guiding layer and configured to generate the light;
  a low refraction layer disposed on the exit surface of the light guiding layer;
  a color control layer disposed on the low refraction layer; and
  a protection layer disposed on the color control layer, wherein the protection layer includes a resin composition including a first repeating unit represented by Formula 1 and a third repeating unit represented by Formula 3 below:

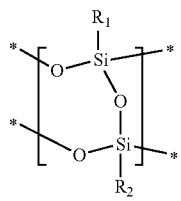

[Formula 1]

in Formula 1, $R_1$ and $R_2$ are each independently selected from a hydrogen atom, a deuterium atom, a halogen atom, a substituted or unsubstituted amine group, a substituted or unsubstituted epoxy group, a substituted or unsubstituted group, a substituted or unsubstituted acrylic group, a substituted or unsubstituted methacrylic group, a substituted or unsubstituted isocyanate group, a nitrile group, a nitro group, a substituted or unsubstituted alkenyl group having 2 to 10 carbon atoms, a substituted or unsubstituted heterocycloalkyl group having 2 to 12 ring-forming carbon atoms, a substituted or unsubstituted aralkyl group having 2 to 30 ring-forming carbon atoms, a substituted or unsubstituted aralkyl group having 6 to 30 ring-forming carbon atoms, a substituted or unsubstituted aryloxy group having 6 to 30 ring-forming carbon atoms, or a substituted or unsubstituted aryl thiol group having 6 to 30 ring-forming carbon atoms,

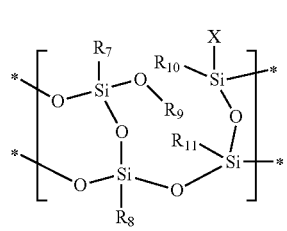

[Formula 3]

Formula 3, X is either $OR_{12}$ or $O(SiO_{3/2}R_{13})_{4+2n}$, and $R_7$ to $R_{13}$ are each independently selected from a hydrogen atom, a deuterium atom, a halogen atom, a substituted or unsubstituted amine group, a substituted or unsubstituted epoxy group, a substituted or unsubstituted thiol group, a substituted or unsubstituted acrylic group, a substituted or unsubstituted methacrylic group, a substituted or unsubstituted isocyanate group, a nitrile group, a nitro group, a substituted or unsubstituted alkenyl group having 2 to 10 carbon atoms, a substituted or unsubstituted heterocycloalkyl group having 2 to 12 ring-forming carbon atoms, a substituted or unsubstituted heteroaryl group having 2 to 30 ring-forming carbon atoms, a substituted or unsubstituted aralky group having 6 to 30 ring-forming carbon atoms, a substituted or unsubstituted aryloxy group having 6 to 30ring-forming carbon atoms, or a substituted or unsubstituted aryl thiol group having 6 to 30 ring-forming carbon atoms, and
  n is an integer of 0 or more,
  wherein the resin composition is not a hydrogen silsesquioxane.

2. The backlight unit of claim 1, wherein a mole ratio of the first repeating unit and the third repeating unit is 1:1000 to 1000:1.

3. The backlight unit of claim 1, wherein the protection layer further comprises a silica particle.

4. The backlight unit of claim 1, wherein the protection layer is disposed in an outermost region of the backlight unit.

5. The backlight unit of claim 1, wherein the color control layer comprises at least one quantum dot.

6. The backlight unit of claim 5, wherein the color control layer further comprises:
  a base resin; and
  light scattering particles dispersed in the lase resin.

7. The backlight unit of claim 1, wherein the low refraction layer has a refractive index of 1.2 to 1.4, and comprises hollow silica.

8. The backlight unit of claim 1, wherein the low refraction layer is disposed directly on the light guiding layer.

9. The backlight unit of claim 1, further comprising at least one barrier layer disposed adjacent to at least one surface of the color control layer.

10. The backlight unit of claim 9, wherein the barrier layer comprises at least one inorganic film.

11. The backlight unit of claim 1, further comprising a barrier layer disposed between the color control layer and the low refraction layer and between the color control layer and the protection layer, respectively.

12. The backlight unit of claim 1, wherein the light guiding layer comprises a light guiding pattern.

13. A liquid crystal display device comprising:
  a liquid crystal display panel configured to display an image; and a backlight unit configured to provide light to the liquid crystal display panel, wherein the backlight unit includes:
a light source configured to generate the light;
a light guiding layer configured to guide the light generated from the light source;
low refraction layer disposed on the light guiding layer;
a color control layer disposed on the low refraction layer; and
a protection layer disposed on the color control layer, and including a resin composition including a first repeating unit represented by Formula 1 and a third repeating unit represented by Formula 3 below:

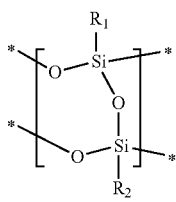

[Formula 1]

in Formula 1, $R_1$ and $R_2$ are each independently selected from a hydrogen atom, a deuterium atom, a halogen atom a substituted or unsubstituted amine group, a substituted or unsubstituted epoxy group, a substituted or unsubstituted thiol group, and acrylic group, a methacrylic group, an isocyanate group, a nitrile group, a nitro group, a substituted or unsubstituted alkenyl group having 2 to 10 carbon atoms, a substituted or unsubstituted heterocycloalkyl group having 3 to 12 ring-forming carbon atoms, a substituted or unsubstituted heteroaryl group having 2 to 30 ring-forming carbon atoms, a substituted or unsubstituted aralkyl group having 3 to 12 ring-forming carbon atoms, a substituted or unsubstituted aryloxy group having 3 to 12 ring-forming carbon atoms, or a substituted or unsubstituted aryl thiol group having 3 to 12 ring-forming carbon atoms,

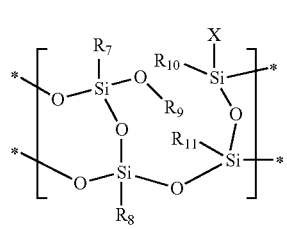

[Formula 3]

Formula 3, X is either $OR_{12}$ or $O(SiO_{3/2}R_{13})_{4+2n}$, and $R_7$ to $R_{13}$ are each independently selected from a hydrogen atom, a deuterium atom, a halogen atom, a substituted or unsubstituted amine group, a substituted or unsubstituted epoxy group, a substituted or unsubstituted thiol group, a substituted or unsubstituted acrylic group, a substituted or unsubstituted methacrylic group, a substituted or unsubstituted isocyanate group, a nitrile group, a nitro group, a substituted or unsubstituted alkenyl group having 2 to 10 carbon atoms, a substituted or unsubstituted heterocycloalkyl group having 2 to 12 ring-forming carbon atoms, a substituted or unsubstituted heteroaryl group having 2 to 30 ring-forming carbon atoms, a substituted or unsubstituted aralky group having 6 to 30 ring-forming carbon atoms, a substituted or unsubstituted aryloxy group having 6 to 30ring-forming carbon atoms, or a substituted or unsubstituted aryl thiol group having 6 to 30 ring-forming carbon atoms, n is an integer of 0 or more, wherein the resin composition is not a hydrogen silsesquioxane.

14. The liquid crystal display device of claim 13, wherein the low refraction layer comprises hollow silica.

15. The liquid crystal display device of claim 13, wherein the color control layer comprises at least one quantum dot.

16. The backlight unit of claim 1, wherein the protection layer has a pencil hardness of at least 5 H.

17. The backlight unit of claim 1, wherein the low refraction layer has a lower refractive index than refractive indexes of the light guiding layer and the color control layer.

* * * * *